United States Patent [19]

Self et al.

[11] 3,890,058

[45] June 17, 1975

[54] DRILL GUIDING APPARATUS

[75] Inventors: Edgar L. Self, Fremont; John C. Gormley, Dixon, both of Calif.

[73] Assignee: Rhodes Investment Company, San Jose, Calif.

[22] Filed: Nov. 1, 1973

[21] Appl. No.: 411,690

[52] U.S. Cl. .............................. 408/112; 408/712
[51] Int. Cl. ............................................ B23b 45/14
[58] Field of Search ................... 408/112, 712, 202

[56] References Cited
UNITED STATES PATENTS

| | | | |
|---|---|---|---|
| 2,831,376 | 4/1958 | Daniels | 408/112 X |
| 2,849,900 | 9/1958 | Heidtman, Jr. | 408/112 |
| 3,534,639 | 10/1970 | Treichler | 408/112 |
| 3,746,460 | 7/1973 | Lipe | 408/112 |

*Primary Examiner*—Andrew R. Juhasz
*Assistant Examiner*—Z. R. Bilinsky
*Attorney, Agent, or Firm*—Naylor, Neal & Uilkema

[57] ABSTRACT

An apparatus for supporting an electric hand drill and for guiding the hand drill toward and away from the surface of a work piece so as to permit the drilling of a hole in the surface at any desired angle. The drill is supported between spaced apart rigid guides and a protractor-like mechanism is provided for adjustably attaching the guides to a base. The protractor-like mechanism includes a pivot joint so that the guides can be set at any desired angle with respect to the base. The base has a linear edge parallel to the pivot axis which assists in positioning the base on the work piece with respect to the desired hole location. A structure is provided for mounting the electric hand drill in the drill guide apparatus, which structure affords convenient installation and removal of the drill and affords support of the drill in the apparatus at two spaced-apart regions for improved stability. The mounting structure is adapted so as not to interfere with hand engagement of the pistol grip handle of the drill. Adjustable stops are provided for limiting the amount of movement of the drill within the guides.

7 Claims, 4 Drawing Figures

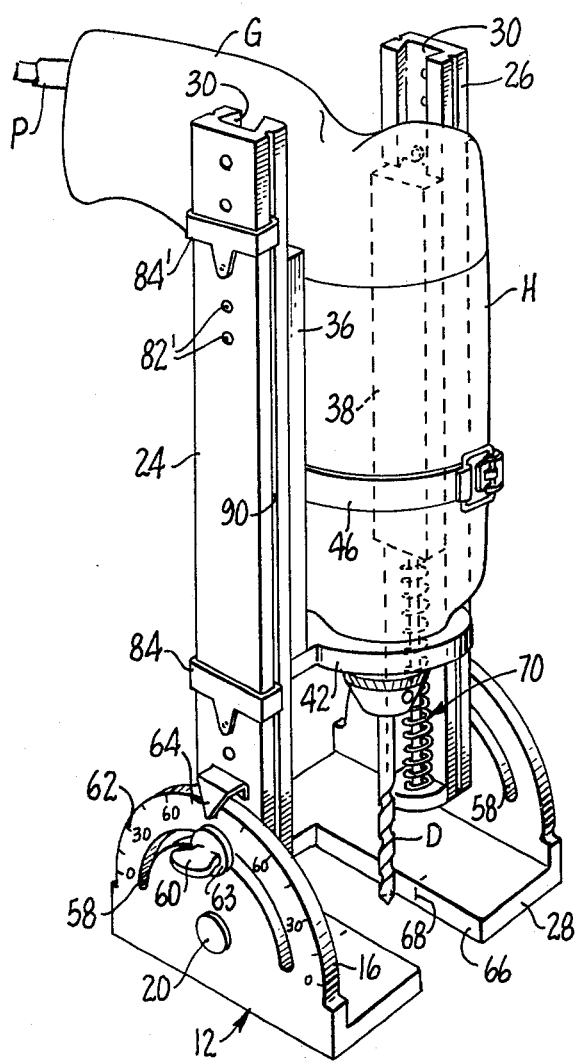
FIG. 1.
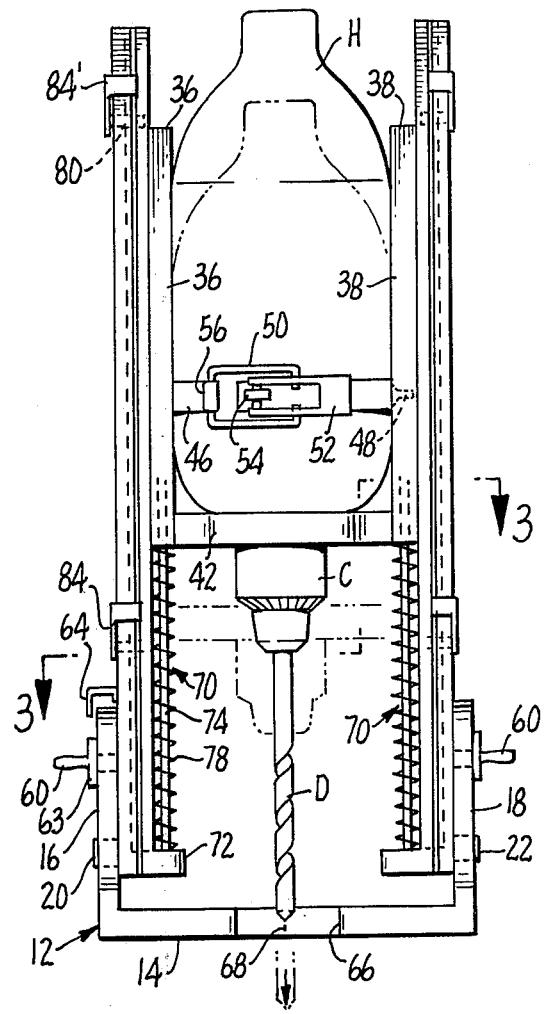
FIG. 2.
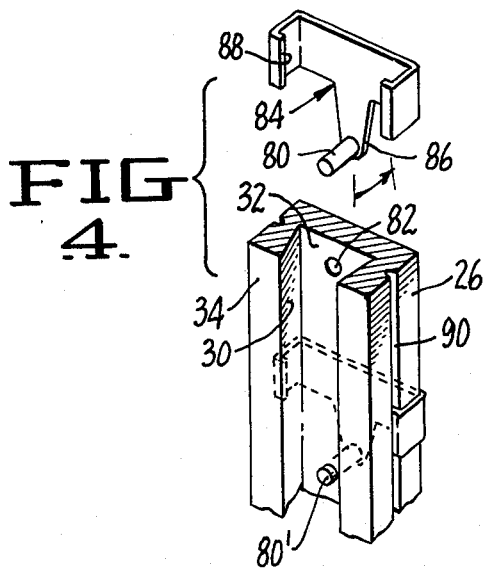
FIG. 4.
FIG. 3.

DRILL GUIDING APPARATUS

SPECIFICATION

This invention relates to a drill guiding apparatus in which an electric hand drill can be secured and which guides the drill along a path that bears a precise angular relationship to the surface of the work piece in which a hole is drilled.

Drilling holes at a precise and accurate angle with a hand held drill is at best difficult and at worst impossible. Among the forms of guides heretofore disclosed in the prior art, a device as disclosed in U.S. Pat. No. 3,464,295 affords a degree of accuracy not achievable freehand. Although the device in the afore-cited patent affords improvement over freehand drilling, the present invention achieves the same improvement and, in addition, affords further salutary operating advantages.

An object of the present invention is to provide a drill guiding apparatus that confines the drill for movement along a path with substantial precision. This object is achieved by providing a pair of guide bars in which are formed dovetail slots or the like and by providing elongate slides having protrusions corresponding in shap to the dovetail slots for slidable movement therein. Rigid with the slides is a mechanism for securing the drill thereto; the slides have substantial length so that they are confined to movement in the dovetail slots without significant lateral movement or play.

Another object is to provide a drill guiding apparatus in which the angle of the hole to be drilled with respect to the surface of the work piece can be readily and accurately adjusted. This object is achieved by mounting the lower ends of the guide bars for pivotal movement about an axis and by providing a protractor-like indicator which facilitates adjustment of the guide bars at any desired angle with respect to the work piece surface.

Still another object of the present invention is to provide a drill guide which expedites drilling a row of holes at spaced intervals along a line on the work piece. The present invention accomplishes this object by providing a base having four linear sides arranged in a rectangular pattern. A straight edge can be clamped on the work piece surface and one of the linear edges of the base can be positioned against the straight edge. As the base is moved along the straight edge, each hole drilled will be at a constant distance from the straight edge.

A further object of the present invention is to provide a drill guiding apparatus that affords quick installation and removal of the drill with respect to the guiding apparatus. This object is achieved by the provision of two spaced-apart drill support members, the lower of which defines an opening corresponding in shape to a part of the drill housing near the chuck and the upper of which comprises a toggle operated clamping band remote from the lower member.

A feature and advantage of the two-point drill support mentioned above is that the drill is securely retained within the drill guide apparatus.

Yet a further object of the present invention is to provide a mechanism which permits the depth of the hole to be regulated and repeated with accuracy. This object is achieved by the provision of a movable stop in the slots in the guide bars. When the slides contact the stop member, further downward movement of the drill is inhibited and, because the stops can be positioned virtually any place along the slot, holes of virtually any depth can be drilled by employment of the apparatus.

The foregoing, together with other objects, features and advantages, will be more apparent after referring to the following specification and accompanying drawing in which:

FIG. 1 is a perspective view of a drill guiding apparatus according to the present invention;

FIG. 2 is a front elevational view of the guiding apparatus;

FIG. 3 is a cross-sectional view taken generally along line 3—3 of FIG. 2; and,

FIG. 4 is an exploded fragmentary view at enlarged scale showing one form of depth stop member according to the invention.

An electric hand drill with which the guiding apparatus of this invention is used is of conventional form and includes a housing H from one end of which extends a hand grip G. Within housing H is an electric motor which is supplied with power through a power cord P. The motor has a shaft which drives a chuck C. Chuck C retains any suitable tool, such as a drill bit D.

Referring more particularly to the drawing, reference numeral 12 generally indicates a base that supports the remainder of the drill guide and the drill. Base 12 has a planar lower surface 14 which is adapted to rest on the surface of a work piece in which it is desired to drill a hole. As seen in FIG. 1, base 12 has four linear sides arranged in a rectangular configuration; from opposite side edges of the base, plates 16 and 18 extend upward from the base. Plates 16 and 18 define aligned holes adjacent to and somewhat above base 12 and midway between the front and rear extremities of the plates to receive pivot pins 20 and 22, respectively. Pivot pins 20 and 22 are coaxial. Fixed to the inner ends of pivot pins 20 and 22 are guide bars 24 and 26. This form of connection between the guide bars and the base affords pivotal movement of the bars relative to the base about an axis coincident with the central axis of pivot pins 20 and 22. Such axis is parallel to planar surface 14 and is also parallel to the front edge 28 of base 12.

Guide bars 24 and 26 are each excised on their respective inner surfaces to define a dovetail slot 30. As seen in FIG. 4, the dovetail slot has an inner dimension at surface 32 that is greater than the dimension at surface 34 of the guide bar.

Adapted for sliding movement with respect to guide bars 24 and 30 are slides 36 and 38. Slide 38, as seen in FIG. 3, is typical of both slides in that it has a dovetail shaped projection 40 that slidably engages the walls of slot 30. Projection 40 is preferably co-extensive with slide 38 which, as seen most clearly in FIG. 2, has a substantial length approximating that of the drill housing H. Such length increases the area of contact between projection 40 and walls of slot 30 so that the slides, and therefore the drill housing H, are accurately confined to a linear path and do not move laterally of the path.

Spanning the lower ends of slides 36 and 38 and rigidly connected thereto is a lower drill housing support member 42. Support member 42 defines centrally thereof an opening 44 which is shaped congruent to the shape of housing H adjacent chuck C. Spaced upward from drill support member 42 is a semi-flexible band 46 which can be made of spring steel or the like. Portions of band 46 in alignment with slides 36 and 38 are secured to respective slides 36 and 38; a screw 48 exemplifies one suitable form of attachment means for the band to the slides. Means for selectively tensioning band 46 is provided; such means is exemplified in FIG.

2 by a toggle assembly that includes a bail 50 and a toggle handle 52 which is supported on the band by a pivot 54. The other end of band 46 is formed with a hook 56 in which bail 50 is engaged prior to depressing handle 52. Thus, when the toggle action is closed, band 46 is tensioned to engage firmly drill housing H at a region remote from support member 42. When the toggle latch is released, the drill housing can be quickly removed from the guiding apparatus for use independent of the apparatus.

Because mounting member 42 is rigid and is rigidly connected to slides 36 and 38, the slides move toward and away from base 12 in unison; because the slides engage guide bars 24 and 26, the guide bars move angularly in unison. For retaining the guide bars at a desired angle with respect to planar surface 14 of base 12, plates 16 and 18 are formed with arcuate slots 58. Slots 58 are concentric with the pivot axis of pivot pin 20. In alignment with slots 58, guide bars 24 and 26 define tapped holes in which the threaded shafts of thumb screws 60 are engaged. Each thumb screw 60 has a flange 63 which, when the screw is tightened, frictionally engages the surfaces of plates 16 and 18 adjacent the slots. Accordingly, the thumb screws 60 can be loosened to afford adjustment of the angle of guide bars 24 and 26 and can be tightened to retain the guide bars at the desired angular position with respect to the pivot axis defined by pivot pins 20 and 22.

For facilitating accurate adjustment of the angle of guide bars 24 and 26, and therefore the angle of the path along which drill bit D moves, there is formed in at least one of plates 16 and 18 a series of indicia 62 which are arranged in a protractor-like configuration and in an arcuate path concentric with the pivot axis through the center of pivot pins 20 and 22. Secured to guide bar 24 is an index pointer 64 which in cooperation with indicia 62 affords a visual indication of the angle between the guide bars and base surface 14.

In order to permit drill bit D to contact the surface of the work piece on which base 12 is supported, the base is formed with a passage 66. As seen in FIG. 2, passage 66 has substantial width in order to avoid obscuring layout lines on the work piece surface. Further contributing to the avoidance of obscuring the layout marks on the work piece is the fact that passage 66 extends to edge 28 of the base. For facilitating alignment between the axis of drill D and layout lines on the work piece, both the top surface of base 12 and the edges of passage 66 therethrough are provided with scribe lines or indicia 68 which are in alignment with the drilling axis when the guide bars 24 and 26 are at a 90° position with respect to the base.

In order to facilitate use of the drill guide apparatus, the drill housing supporting members, and therefore the drill housing, are retained in an upward position, a position at which drill bit D is above the surface of the work piece. To achieve this advantageous operating characteristic, the invention includes biasing mechanisms 70. Biasing mechanisms 70 associated with slides 36 and 38 are identical. Each includes, rigid with the lower end of guide bars 24 and 26, an abutment 72 which extends inward from the lower end of the guide bar. Fixed to abutment 72 is a rod 74 which extends upward to slides 36 and 38; the slides are drilled at 76 so as to slidably receive the upper end of rod 72 therein. Thus as slides 36 and 38 are moved downward in unison, rods 72 enter drilled holes 76. A compression spring 78 is disposed in circumscribing relation to rod 74 and extends from the upper surface of abutment 72 to the lower surface of drill housing support member 42 so that, when the support member and slides 36 and 38 are moved downward, energy is stored in the compression spring, which energy is employed to return drill housing H to the upward position when downward force on the drill housing is released.

The present invention is adapted to limit the downward movement of the drill housing in order to afford the capability of drilling a plurality of holes, each having the same depth. For this purpose there is provided a stop member in the form of a pin 80 (see FIG. 4) for each guide bar 24 and 26. Pin 80 is adapted to extend through one of a series of holes 82 in guide bars 24 and 26; pin 80 is of sufficient length that a portion thereof extends into slots 30, as at 80' in FIG. 4. The opposite end of pin 80 is secured to a spring clip 84 which is formed of spring steel or the like. Pin 80 is secured to a tab 86 that depends from the main body of the clip. The main body has at opposite extremities thereof inward extending fingers 88; the front and rear surfaces of the guide bars 24 and 26 are formed with grooves 90 into which the fingers enter to retain the clip and pin 80 in a desired location.

For limiting the amount of upward movement of drill housing H identical clips 84' can be provided, there being a series of holes 82' into which the pins associated with clips 84' can be introduced.

In operation, the hand drill is installed into the guide apparatus by loosening toggle clamp 52, inserting the drill housing so that the lower end thereof engages the portions of support member 42 that define hole 44 and then engaging the toggle clamp. Thereafter, the angle of the drilled hole with respect to the work piece surface is established by loosening thumb screws 60 and positioning guide bars 24 and 26 so that pointer 64 is opposite the indicia 62 that corresponds to the desired angle. Thumb screws 60 are then tightened and the guide is ready for use. Power is supplied to the drill and downward pressure on grip G brings drill D into engagement with the work piece surface. The substantial extent of passage 66 and the fact that the passage extends to edge surface 28 expedites visual alignment of drill D with any layout marks on the work piece surface. Moreover, score lines 68 further assist in such alignment. Should a series of holes arranged along a straight line be desired, a guide strip having a straight edge can be clamped or otherwise temporarily fixed to the work piece at a distance from the location of the holes such that, when surface 28 is against the guide strip, drill D will be in position at the desired location. After one hole is drilled, the entire assembly can then be slid along the guide strip and, as long as base edge surface 28 is maintained in contact with the guide strip, the desired straight line relationship of the holes will be achieved. Because the base is rectangular, other edges than edge 28 can be employed to a similar purpose.

Should a plurality of holes of uniform depth be desired, clip 84 can be employed to position pin 80 in any of the holes 82 in order to limit the upward and downward travel of the drill in the guide. Because of the presence of the biasing mechanism 70, the drill will return to an upward position when released so as to facilitate movement of the guide to another position on the work piece. Because of the limited width of guide bars 24 and 26, the grip G of the drill is conveniently accessible to the operator even when the drill is in place in the guide.

Although one embodiment of the invention has been shown and described, other adaptations and modifications can be made without departing from the true spirit and scope of the invention.

What is claimed is:

1. Apparatus for guiding a powered hand drill along a path toward and away from the surface of a work piece, said drill being of the type having a housing, a motor in the housing, and a tool gripping chuck exterior of the housing and in driven relation to the motor, the chuck being driven by the motor about a drilling axis, said apparatus comprising a base having a lower surface for contacting the surface of the work piece, first and second elongate guide bars extending upward from said base, means for mounting said guide bars to said base in parallel, spaced-apart relation on opposite sides of said path, first and second slides supported for movement along said guide bars toward and away from said base, a drill support member attached to said slides and spanning the space therebetween, said drill support member defining an opening for affording extension of said chuck therethrough, said support member having a portion bounding said opening for engaging the housing adjacent the chuck, means spaced from said support member for securing said housing at a site remote from the chuck to said slides, said support member and said securing means being adapted to mount said drill so that the drilling axis is parallel to the path, said base defining a passage therethrough in alignment with the drilling axis so as to permit a tool in the chuck to contact the work piece in response to movement of said drill along the path, means extending inward from said guide bars for defining abutments at the ends of said guide bars adjacent said guide bar mounting means, said slides having end faces confronting said abutments, a pair of compression springs for resiliently biasing said slides away from said base, one of said springs being disposed between one of said abutments and the end face of the slide confronting said abutment and the other of said springs being disposed between the other of said abutments and the end face of the slide confronting said other abutment, a rigid rod disposed within each of said springs for supporting the spring, each said rod having a lower end secured to the abutment opposed to the spring within which the rod is disposed, said slides each having a longitudinal opening in alignment with the rod disposed in the spring opposed thereto, in which opening said rod slides in response to movement of said slides toward and away from said base.

2. Apparatus, according to claim 1, wherein said guide bar mounting means comprises first and second plates rigid with said base and upstanding therefrom on opposite sides of said passage, means for joining the ends of said guide bars to respective said plates for pivotal movement about a pivot axis normal to the drilling axis and parallel to the base surface, and means for releasably retaining said guide bars to said plates at selected angles relative to said base so that the angle between said path and the work piece surface can be established at any magnitude.

3. Apparatus, according to claim 2, wherein said base has a linear edge surface parallel to said pivot axis.

4. Apparatus, according to claim 3, wherein said passage extends to said edge surface.

5. Apparatus, according to claim 1, wherein said guide bars include longitudinally extending slots having an inner dimension greater than the dimension of said slots at the inner surfaces of said guide bars, said slides including complemental projections slidable engaged in respective said slots, said projections having a length approximating that of the drill housing.

6. Apparatus, according to claim 5, including a stop member and means for mounting said stop member in said slot to limit the movement of said slides toward said base at a preselected one of a plurality of positions.

7. Apparatus, according to claim 1, wherein said securing means includes a semi-flexible band adapted to circumscribe said housing, means for securing said band to respective said slides, and means for selectively tensioning said band between an engage position at which said housing is immovably secured to said slides and a release position at which said drill can be removed from said apparatus.

* * * * *